US009147331B2

(12) United States Patent
Venkatraman et al.

(10) Patent No.: US 9,147,331 B2
(45) Date of Patent: Sep. 29, 2015

(54) METHOD AND APPARATUS FOR USE IN IDENTIFYING POTENTIAL ANOMALIES IN ELECTRONIC FILES SUPPORTIVE OF MOBILE DEVICE POSITIONING

(71) Applicant: QUALCOMM Incorporated, San Diego, CA (US)

(72) Inventors: Sai Pradeep Venkatraman, Santa Clara, CA (US); Saumitra Mohan Das, Santa Clara, CA (US); Ju-Yong Do, Palo Alto, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/797,125

(22) Filed: Mar. 12, 2013

(65) Prior Publication Data

US 2014/0266697 A1  Sep. 18, 2014

(51) Int. Cl.
```
G08B 1/08      (2006.01)
G08B 21/18     (2006.01)
G01C 21/20     (2006.01)
G01S 5/02      (2010.01)
G01C 21/16     (2006.01)
```

(52) U.S. Cl.
CPC ............... *G08B 21/18* (2013.01); *G01C 21/16* (2013.01); *G01C 21/206* (2013.01); *G01S 5/0252* (2013.01); *G01S 5/0294* (2013.01)

(58) Field of Classification Search
None
See application file for complete search history.

(56) References Cited

U.S. PATENT DOCUMENTS

| | | | | |
|---|---|---|---|---|
| 8,441,367 | B1* | 5/2013 | Lee et al. | 340/686.6 |
| 2005/0124354 | A1* | 6/2005 | Durgin | 455/456.1 |
| 2007/0018811 | A1* | 1/2007 | Gollu | 340/539.13 |
| 2012/0007779 | A1* | 1/2012 | Klepal et al. | 342/451 |
| 2012/0056785 | A1 | 3/2012 | Jovicic et al. | |
| 2012/0290636 | A1 | 11/2012 | Kadous et al. | |
| 2013/0017842 | A1* | 1/2013 | Gupta et al. | 455/456.1 |
| 2014/0125700 | A1* | 5/2014 | Ramachandran et al. | 345/633 |
| 2015/0019124 | A1* | 1/2015 | Bandyopadhyay et al. | 701/410 |

FOREIGN PATENT DOCUMENTS

| | | | |
|---|---|---|---|
| WO | 2011144967 | A1 | 11/2011 |
| WO | WO-2012154926 | A2 | 11/2012 |

OTHER PUBLICATIONS

International Search Report and Written Opinion—PCT/US2014/022220—ISA/EPO—Jul. 7, 2014.
Widyawan, et al., "Influence of Predicted and Measured Fingerprint on the Accuracy of RSSI-based Indoor Location Systems," 4th Workshop on Positioning, Navigation and Communication, Mar. 2007, pp. 145-151.

* cited by examiner

*Primary Examiner* — Julie Lieu
(74) *Attorney, Agent, or Firm* — Berkeley Law & Technology Group, LLP

(57) ABSTRACT

Various methods, apparatuses and/or articles of manufacture are provided which may be implemented by one or more electronic devices to identify potential anomalies in one or more electronic files used to support mobile device positioning within a specific environment. Various methods, apparatuses and/or articles of manufacture are also provided which may be implemented by one or more electronic devices to alter one or more electronic files used to support mobile device positioning within a specific environment.

40 Claims, 5 Drawing Sheets

200

202 — Obtain a measurement report indicative of one or more measurements gathered by a mobile device while located within a specific environment

210 — Generate positioning tracks for the mobile device, including at least: a first positioning track based, at least in part, on the measurement report and at least one constraint as indicated in at least one electronic file and which corresponds to at least one feature identified as present within the specific environment; and, a second positioning track based, at least in part, on the measurement report but not the same constraint(s), e.g., different constraint(s) or no constraint(s)

214 — Identify a potential anomaly in the electronic file based, at least in part, on at least the first positioning track and the second positioning track

```
┌─────────────────────────────────────────────────────────────────────────┐
│ Obtain a measurement report indicative of one or more measurements      │
│ gathered by a mobile device while located within a specific environment │
│ ┌─────────────────────────────────────────────────────────────────────┐ │
│ │ Determine one or more measurements based, at least in part, on one  │ │
│ │ or more measurements obtained using one or more sensors             │ │
│ └──────────────────────────────────────────────────────────── 204 ───┘ │
│ ┌─────────────────────────────────────────────────────────────────────┐ │
│ │ Determine one or more measurements based, at least in part, on one  │ │
│ │ or more wireless signals acquired by the mobile device              │ │
│ └──────────────────────────────────────────────────────────── 206 ───┘ │
│ ┌─────────────────────────────────────────────────────────────────────┐ │
│ │ Specify at least a portion of a determined track in the measurement │ │
│ │ report                                                              │ │
│ └──────────────────────────────────────────────────────────── 208 ───┘ │
└──────────────────────────────────────────────────────────────── 202 ───┘
                                   ↓
┌─────────────────────────────────────────────────────────────────────────┐
│ Generate positioning tracks for the mobile device, including at least:  │
│ a first positioning track based, at least in part, on the measurement   │
│ report and at least one constraint as indicated in at least one         │
│ electronic file and which corresponds to at least one feature           │
│ identified as present within the specific environment; and, a second    │
│ positioning track based, at least in part, on the measurement report    │
│ but not the same constraint(s) (e.g., different constraint(s) or no     │
│ constraint(s))                                                          │
│ ┌─────────────────────────────────────────────────────────────────────┐ │
│ │ Generate positioning tracks for one or more other mobile devices    │ │
│ │ relative to the specific environment                                │ │
│ └──────────────────────────────────────────────────────────── 212 ───┘ │
└──────────────────────────────────────────────────────────────── 210 ───┘
                                   ↓
┌─────────────────────────────────────────────────────────────────────────┐
│ Identify a potential anomaly in the electronic file based, at least in  │
│ part, on at least the first positioning track and the second            │
│ positioning track                                                       │
│ ┌─────────────────────────────────────────────────────────────────────┐ │
│ │ Compare at least two positioning tracks                             │ │
│ └──────────────────────────────────────────────────────────── 216 ───┘ │
│ ┌─────────────────────────────────────────────────────────────────────┐ │
│ │ Compare at least one positioning track with a determined track of   │ │
│ │ the mobile device                                                   │ │
│ └──────────────────────────────────────────────────────────── 218 ───┘ │
│ ┌─────────────────────────────────────────────────────────────────────┐ │
│ │ Consider one or more positioning tracks for one or more other       │ │
│ │ mobile devices                                                      │ │
│ └──────────────────────────────────────────────────────────── 220 ───┘ │
└──────────────────────────────────────────────────────────────── 214 ───┘
              ↓                                      ↓
┌──────────────────────────────┐      ┌──────────────────────────────┐
│ Affect at least a portion of │      │ Initiate an anomaly alert    │
│ the electronic file          │      │                              │
└────────────────────── 222 ──┘      └────────────────────── 224 ──┘
```

FIG. 2B

METHOD AND APPARATUS FOR USE IN IDENTIFYING POTENTIAL ANOMALIES IN ELECTRONIC FILES SUPPORTIVE OF MOBILE DEVICE POSITIONING

BACKGROUND

1. Field

The subject matter disclosed herein relates to electronic devices, and more particularly to methods, apparatuses and articles of manufacture for use by one or more electronic devices to identify potential anomalies in one or more electronic files used to support mobile device positioning within a specific environment.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or a tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc. In another example, certain wireless signal-based positioning capabilities make use of wireless signals acquired from terrestrial-based wireless transmitting devices, such as, e.g., a dedicated positioning Beacon transmitting device, an access point (AP) which may be part of a wireless local area network, a base transceiver station which may be part of the cellular telephone system, and/or the like or some combination thereof.

In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

Unfortunately, certain environments may be altered from time to time in a manner which may affect the accuracy of some of the corresponding electronic files, which may lead to a reduction in the effectiveness of a positioning capability relying on such electronic files, and/or otherwise affect a user's experience.

SUMMARY

In accordance with certain aspects, a method may be implemented with a computing platform which comprises: obtaining a measurement report indicative of measurements gathered by a mobile device while located within a specific environment; and generating a plurality of positioning tracks for the mobile device relative to the specific environment, the plurality of positioning tracks comprising at least: a first positioning track that is determined based, at least in part, on the measurement report and a constraint, the constraint being indicated in an electronic file and corresponding to a feature previously identified as being present within the specific environment; and a second positioning track that is determined based, at least in part, on the measurement report but not the constraint. The method may further comprise identifying a potential anomaly in the electronic file based, at least in part, on at least the first positioning track and the second positioning track.

In accordance with certain aspects, an apparatus for use in an electronic device may comprise: means for obtaining a measurement report indicative of measurements gathered by a mobile device while located within a specific environment; and means for generating a plurality of positioning tracks for the mobile device relative to the specific environment, the plurality of positioning tracks comprising at least: a first positioning track that is determined based, at least in part, on the measurement report and a constraint, the constraint being indicated in an electronic file and corresponding to a feature previously identified as being present within the specific environment; and a second positioning track that is determined based, at least in part, on the measurement report but not the constraint. The apparatus may further comprise means for identifying a potential anomaly in the electronic file based, at least in part, on at least the first positioning track and the second positioning track.

In accordance with certain aspects, an electronic device may comprise: memory; and a processing unit configured to: obtain a measurement report from the memory, the measurement report being indicative of measurements gathered by a mobile device while located within a specific environment; and generate a plurality of positioning tracks for the mobile device relative to the specific environment, the plurality of positioning tracks comprising at least: a first positioning track that is determined based, at least in part, on the measurement report and a constraint, the constraint being indicated in an electronic file and corresponding to a feature previously identified as being present within the specific environment; and a second positioning track that is determined based, at least in part, on the measurement report but not the constraint. The processing unit may be further configured to identify a potential anomaly in the electronic file based, at least in part, on at least the first positioning track and the second positioning track.

In accordance with certain aspects, an article of manufacture may comprise a non-transitory computer readable medium having stored therein computer implementable instructions executable by a processing unit of a computing platform to: obtain a measurement report indicative of measurements gathered by a mobile device while located within a specific environment; and generate a plurality of positioning tracks for the mobile device relative to the specific environment, the plurality of positioning tracks comprising at least: a first positioning track that is determined based, at least in part, on the measurement report and a constraint, the constraint being indicated in an electronic file and corresponding to a feature previously identified as being present within the specific environment; and a second positioning track that is determined based, at least in part, on the measurement report but not the constraint. The computer implementable instructions may be further executable by the processing unit to identify a potential anomaly in the electronic file based, at least in part, on at least the first positioning track and the second positioning track.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 2A and FIG. 2B are flow diagrams illustrating example processes that may be implemented to identify potential anomalies in one or more electronic files that may be used to support mobile device positioning within a specific environment, in accordance with certain example implementations.

DETAILED DESCRIPTION

Figure 1:
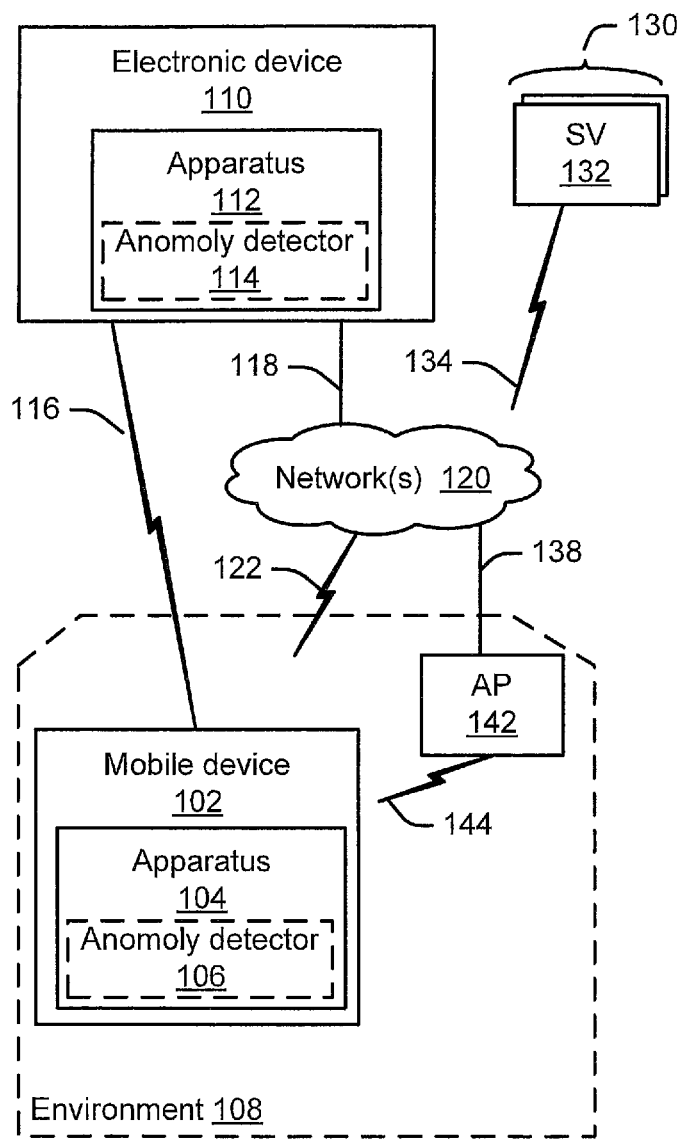
FIG. 1 is a schematic block diagram illustrating an arrangement of representative electronic devices including one or more electronic devices to identify potential anomalies in one or more electronic files that may be used to support mobile device positioning within a specific environment, in accordance with an example implementation.

A mobile device may be configured to determine (and/or assist another electronic device in determining) the mobile device's position and/or movements within a specific environment using a variety of known positioning and/or navigation techniques. For example, a mobile device may be configured to determine (and/or assist in determining) its position and/or movements with respect to some coordinate system based, at least in part, on one or more wireless signals transmitted by one or more wireless signal transmitting devices. By way of example, in certain instances a wireless signal transmitting device may comprise a space vehicle (SV) of a satellite positioning system (SPS) having determinable position coordinates. Accordingly, a mobile device having acquired an SPS signal may determine a pseudorange to the SV using known techniques, e.g., based on a signal propagation time. In another example, in certain instances a wireless signal transmitting device may comprise a terrestrial-based wireless signal transmitting device (e.g., a dedicated position Beacon transmitting device, a service access transceiver device, etc.) having known or determinable position coordinates. A mobile device, having acquired a wireless signal from such a wireless transmitting device, may determine its range from such device using known techniques, e.g., based on a signal propagation time and/or delay (e.g., a round trip time (RTT), etc.), a signal parameter measurement (e.g., a received signal strength indicator (RSSI), etc.), and/or the like or some combination thereof. These and other wireless signal-based positioning techniques are well known and further details are beyond the scope of the present description.

In certain instances, a mobile device may be configured to determine (and/or assist another electronic device in determining) the mobile device's position and/or movements based, at least in part, on evidence of such position and/or movements obtained via one or more onboard sensors, e.g., one or more inertial sensors, one or more environmental sensors, and/or the like or some combination thereof. Hence, for example, a position and/or movement of a mobile device may be determined based, at least in part, on potential changes in position due to movement(s) detected by one or more inertial sensors, such as, e.g., an accelerometer, a gyroscope, etc. In certain instances, a determined position and/or movement of a mobile device may be determined, at least in part, based on potential changes in position due to movement(s) detected by one or more environmental sensors, such as, e.g., a magnetometer, a barometer, etc. These and other sensor-based positioning techniques are also well known and further details are beyond the scope of the present description.

As may be expected, certain positioning techniques may prove more beneficial than others under certain circumstances. For example, SPS wireless signal-based positioning techniques and/or the like may be particularly useful in certain outdoor environments, e.g., wherein SPS signals may propagate along a direct line of sight to the mobile device. However, such SPS wireless signal-based positioning techniques and/or the like may be less useful in certain outdoor or indoor environments having objects which interfere with the mobile device acquiring such SPS signals. A prime example of such an environment is an indoor environment having some structure and/or other object(s) that interfere with SPS signal propagation and/or acquisition. Accordingly, in certain instances, it may be beneficial for a mobile device within certain indoor environments to make use of wireless signals acquired from one or more terrestrial-based wireless signal transmitting devices. Indeed, some terrestrial-based wireless signal transmitting devices may be provisioned specifically for this reason, while others may be provisioned for certain other and/or additional reasons (e.g., network and/or service access, etc.).

In still other implementations, in certain instances it may be beneficial for mobile device within certain environments to make use of one or more on-board sensors to support a positioning capability performed by the mobile device and/or one or more other supporting electronic devices.

With such representative techniques in mind, in certain instances a positioning capability may be capable of tracking a mobile device within an environment, e.g., as the mobile device moves about over a period of time. Further still, in certain instances a positioning capability may be capable of providing a route and/or certain directions to a mobile device, e.g., for possible consideration and/or implementation by a user and/or a machine capable of moving the mobile device toward some target position, etc. Indeed, in yet other instances, it may be useful for a positioning capability to estimate and/or project future position(s) of the mobile device, e.g., based, at least in part, on a current direction and/or rate of travel and/or other aspects relating to a movement of the mobile device within an environment.

Consequently, it may be beneficial for a positioning capability to consider additional information that may be available in one or more electronic files regarding a specific environment, certain characteristics thereof, expected movements of such a mobile device therein, etc. Hence, for example, one or more electronic files may be available which correspond to a physical layout of a specific environment, identify certain objects therein, and/or possibly indicate certain areas as being feasible or infeasible, possibly conditionally-feasible or conditionally-infeasible to a mobile device. By way of example, an electronic file may comprise an electronic map, a routability graph, and/or the like or some combination thereof which corresponds to at least a portion of a specific environment. In another example, one or more electronic files may be available which correspond to certain wireless signaling characteristics and/or the like which may be experienced by a mobile device located within a specific environment. Thus, for example, an electronic file may comprise a radio heatmap and/or the like which corresponds to at least a portion of a specific environment. Such example electronic files and the like are well known and beyond the scope of the present description.

In certain example implementations, a mobile device and/or one or more other supporting electronic devices may obtain (e.g., access, receive) and/or provide (e.g., generate, affect, transmit) various electronic files useful for positioning. In certain example implementations, all or part of such electronic file(s) may be obtained and/or provided as positioning assistance data.

Since a specific environment, particularly an indoor environment, may be altered from time to time it may be beneficial for an electronic file to be updated, as applicable, to account for any such alteration within the specific environment. For example, it is not uncommon for the floor plan of an office suite within a building to undergo various alterations. For example, in certain instances a floor plan may be altered by the addition, subtraction, and/or the rearrangement of internal walls, modular offices, furniture, etc. Clearly, in certain instances some alteration(s) may reduce the accuracy of a corresponding electronic map, routability graph, radio heatmap, and/or the like, which may be used for mobile device positioning.

Unfortunately, while a new tenant of an office suite may be quick to make certain alterations to such a specific environment, there may be a significant delay in updating the electronic file(s) corresponding to the specific environment. Hence, in certain instances, a positioning capability supporting mobile device positioning based, at least in part, on such "outdated" electronic files may be significantly less accurate and/or otherwise less useful for mobile device positioning.

In accordance with certain aspects of the present description, techniques are provided which may be implemented in one or more electronic devices to identify potential anomalies in one or more electronic files that may be used to support mobile device positioning within a specific environment.

Accordingly, in certain example implementations, an apparatus may be provisioned within a mobile device, and/or in another electronic device external to the mobile device. Such an apparatus may, for example, obtain a measurement report that is indicative of one or more measurements gathered by a mobile device while located within a specific environment. Here, for example, in certain instances a measurement report may be based, at least in part, on one or more wireless signals acquired by the mobile device, one or more sensor measurements, one or more position fixes, a determined track, and/or the like or some combination thereof just to name a few examples.

Such an apparatus may, for example, generate a plurality of positioning tracks for the mobile device relative to the specific environment, e.g., using known positioning techniques. However, in accordance with certain aspects presented herein, certain positioning tracks may be generated using different electronic file inputs.

In an example implementation, a plurality of positioning tracks may comprise at least a first positioning track and a second positioning track. The first positioning track may, for example, be determined based, at least in part, on the measurement report and a constraint indicated in an electronic file. The second positioning track may be determined based, at least in part, on the measurement report but without considering the constraint. Hence, such first and second positioning tracks may indicate two hypothesis, one being a positioning track generating applying the constraint indicated in an electronic file and the other being a positioning track similarly generated but without applying the constraint. Accordingly, should one of these hypothetical positioning tracks be identified as being more likely correct and/or accurate within regard the movement of the mobile device within the specific environment, then the presence of the constraint within the electronic file may or may not be identified as representing a potential anomaly.

With this in mind, in certain implementations a constraint may correspond to a "feature" previously identified as being present within the specific environment. By way of example, a "feature" may correspond to one or more objects, physical/structural characteristics, etc., within a specific environment capable of affecting a movement of a person (user) or machine transporting a mobile device into, out of, and/or otherwise within the specific environment. While some features (e.g. a wall) may affect a movement by inhibiting certain movements, other features (e.g., a doorway) may affect a movement by enabling certain movements. Further, in certain instances a "feature" may affect the propagation of one or more wireless signals directed towards and/or transmitted within the specific environment. Various example features are described in subsequent sections.

An apparatus may, for example, attempt to identify a potential anomaly in an electronic file based, at least in part, on at least the first positioning track and the second positioning track. By way of example, an apparatus may identify a potential anomaly in the electronic file based on a comparison of at least the first positioning track with at least the second positioning track, and/or possibly a comparison of at least one of the plurality of positioning tracks with a determined track of the mobile device. In certain instances, a determined track may be determined, at least in part, using a different positioning system and/or mode, e.g., GNSS, cellular, sensor based dead reckoning, user inputs, etc. In certain instances, an apparatus may generate a plurality of positioning tracks for at least one other mobile device relative to the specific environment, and possibly identify a potential anomaly in an electronic file based further, at least in part, on one or more of the available positioning tracks.

As described in greater detail herein, in certain instances such an apparatus may, for example, change (e.g., affect, alter, modify, adjust, transform, amend, add to, delete from, etc.) at least a portion of an electronic file in response to identifying a potential anomaly therein. By way of an example, a constraint indicated within an electronic map, a routability graph, a radio heatmap, and/or the like may be changed in some manner, e.g., possibly to indicate that it may represent a potential anomaly. Hence, in certain instances a constraint representing a potential anomaly may be changed, removed, marked, flagged, etc.

In certain instances, a constraint that may represent a potential anomaly may allow for an inference that a particular feature of a specific environment may have been altered or possibly added. For example, in certain instances the presence of an internal wall may have been previously indicated by a constraint in an electronic map, a routability graph, etc. If a doorway were subsequently formed or added to this internal wall, allowing for mobile device(s) movement(s) "through" this wall, then the constraint may be identified as representing a potential anomaly. Consequently, in certain instances, one may infer (e.g., from mobile device movements) that there may likely be an opening (e.g., doorway, etc.) present in the specific environment. Thus, in certain instances, an electronic file may be changed in some manner based on an inference and/or the like arising from a potential anomaly.

In certain instances, a measure of accuracy, trustworthiness, and/or the like corresponding to an electronic file, and/or a constraint therein (and/or possibly an inference based thereon) may be affected in some manner in response to identifying a potential anomaly, etc.

In certain example implementations, in response to identifying a potential anomaly in an electronic file such an apparatus may, for example, initiate an anomaly alert. By way of example, an anomaly alert may comprise transmitting one or more messages and/or the like to one or more other electronic devices, etc. In certain instances, an anomaly alert may result in a user (e.g., of a mobile device and/or possibly of another electronic device) being informed in some manner with regard to the potential anomaly and/or electronic file. In certain instances, an anomaly alert may result in such a user being prompted for one or more inputs, e.g., with regard to one or more functions supporting the positioning capability, with regard to one or more applicable electronic files, with regard to one or more observations regarding the specific environment, etc. In certain instances, an anomaly alert may affect a measure of accuracy, trustworthiness, and/or the like corresponding to an electronic file. In certain instances, an anomaly alert may suggest switching from a tracking mode and/or the like to a single fix mode and/or the like, e.g., based on a maximum likelihood, etc.

With this introduction in mind, attention is now drawn to FIG. 1, which is a schematic block diagram illustrating an example arrangement 100 comprising at least one mobile device 102. Mobile device 102 is shown in as being located within a specific environment 108. By way of example, as presented herein, at least a portion of specific environment 108 may be representative of an indoor environment.

In this example mobile device 102 comprises an apparatus 104 capable of generating a measurement report indicative of one or more measurements gathered by mobile device 102 while located within specific environment 108. In certain instances, a measurement report may comprise and/or be based, at least in part, on one or more wireless signal measurements, one or more sensor measurements, a determined position fix, a determined track, and/or the like or some combination thereof just to name a few examples.

Apparatus 104 may, for example, may initiate transmission of a measurement report (e.g., via one or more messages) to one or more other electronic devices over a wired and/or wireless communication link. For example, in certain instances apparatus 104 may initiate transmission of a measurement report to an electronic device 110, possibly directly via communication link 116, and/or possibly indirectly via communication link 122, network(s) 120, and communication link 118. In certain instances, apparatus 104 may also or alternatively indirectly initiate transmission of a measurement report to electronic device 110, via communication link 144, an access point (AP) 142 and/or other like device, communication link 138, network(s) 120, and communication link 118. Although certain communication links are illustrated in FIG. 1 as being either wireless communication links or wired communication links, it should be kept in mind that such communication links may comprise wired and/or wireless communication links, and/or even other intervening and/or supporting devices, etc.

In certain example implementations, apparatus 104 may comprise an anomaly detector 106 which may be capable of identifying and/or assisting in identifying one or more potential anomalies in one or more electronic files that may be used to support mobile device positioning within specific environment 108. In certain example implementations anomaly detector 106 may be capable of independently identifying a potential anomaly in an electronic file based, at least in part, on a measurement report. Thus, in certain instances, a measurement report may be obtained by mobile device 102 and made available, at least in part, to anomaly detector 106. For example, measurement report may be obtained by mobile device 102 from apparatus 104.

Electronic device 110, which is located remote to mobile device 102, may comprise an apparatus 112 which may be capable of obtaining one or more measurement reports from one or more mobile devices. For example apparatus 112 may receive (e.g., via one or more electronic messages) a measurement report from mobile device 102 which may be indicative of one or more measurements gathered by mobile device 102 while located within specific environment 108.

In certain example implementations, apparatus 112 may comprise an anomaly detector 114 which may be capable of identifying and/or assisting in identifying one or more potential anomalies in one or more electronic files that may be used to support mobile device positioning within specific environment 108. Thus, for example, in certain instances anomaly detector 114 may independently identify a potential anomaly in an electronic file corresponding to specific environment 108 based, at least in part, on at least a measurement report obtained from mobile device 102.

In certain other example implementations, anomaly detector 114 may assist or otherwise support anomaly detector 106 in an attempt to identify potential anomaly in an electronic file corresponding to specific environment 108. Thus, in certain instances anomaly detector 106 and anomaly detector 114 may represent a distributed processing capability.

It should be kept in mind that, while FIG. 1 shows a single mobile device 102 and a single electronic device 110, each of these illustrated devices may be representative of a plurality of similar devices. Hence, for example, in certain instances apparatus 112 and/or anomaly detector 114 may be implemented using a plurality of electronic devices (e.g., servers, etc.). Hence, for example, mobile device 102 may represent a plurality of mobile devices, each of which may be provisioned with its own apparatus 104 and/or possibly anomaly detector 106.

As illustrated in FIG. 1, mobile device 102 may acquire various wireless signals transmitted from various other electronic devices, some of which may be physically located within specific environment 108 and some of which may be physically located outside of environment 108. In this example, a wireless computing and/or communication network, which may comprise one or more interconnected wireless transceiver devices, is represented by an access point (AP) 142 which may transmit wireless signals over a communication link 144. In certain implementations, mobile device 102 may acquire a wireless signal over communication link 144 and possibly use such wireless signal for positioning, and/or in generating a measurement report. In certain instances, mobile device 102 may be capable of transmitting wireless signals to AP 142 (e.g., AP 142 may represent a transceiver device and/or the like). In other instances, AP 142 may be representative of a wireless transmitting which may be limited to only transmitting wireless signals (e.g., AP 142 may represent a dedicated positioning Beacon transmitter and/or other like transmitting device) sees. In certain implementations, some wireless transceiver devices may be further coupled to one or more other devices. Here, for example, AP 142 is illustrated as having a communication link 138 to network(s) 120.

In certain example implementations, one or more wireless transceiver devices may be provisioned, at least in part, as part of a terrestrial-based positioning system. In certain example implementations, AP 142 and/or network(s) 120 may be representative of a base transceiver station and/or the like, which may be provisioned as part of a cellular communication system.

Network(s) 120 is intended to represent all or part of one or more other electronic devices and/or communication facilities and/or resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

Although communication link 118 between network(s) and electronic device 110 and communication link 138 are illustrated here as representing "wired" communication links it should be understood that in certain instances these communication links may represent one or more wired and/or wireless communication links. Furthermore, it should be understood that a "wired" communication link may comprise electrically conductive wires, cables, etc., and/or similar light or other wavelength conductive members, e.g., fiber-optic cables, waveguides, etc.

As further illustrated, in certain implementations arrangement 100 may comprise one or more space positioning systems (SPS) 130, which may transmit applicable wireless signals that may, at times, be acquired by mobile device 102 and used, at least in part, to support a positioning function. Here, for example, SPS 130 may comprise a plurality of space vehicles (SVs) 132, each of which may transmit one or more SPS signals 134. Further, for example, in certain implementations a terrestrial positioning system may wireless transceiver devices and/or the like, which may transmit one or more positioning signals (e.g., which may be represented here by communication link 144).

Attention is drawn next to FIG. 2A, which is a flow diagram illustrating an example process 200 that may be implemented to identify potential anomalies in one or more electronic files that may be used to support mobile device positioning within a specific environment, in accordance with an example implementation At example block 202, a measurement report may be obtained, which is indicative of one or more measurements gathered by a mobile device 102 while located within a specific environment 108. At example block 210, a plurality of positioning tracks for a mobile device relative to the specific environment may be generated. At example block 214, a potential anomaly in the electronic file may be identified based, at least in part, on at least the first positioning track and the second positioning track.

Attention is drawn next to FIG. 2B, which is a flow diagram illustrating an example process 250, which may comprise and/or build upon certain aspects of process 200. It should be noted that example blocks shown within process 250 using dashed line boxes may be optional in certain example implementations.

At example block 202, a measurement report may be obtained, which is indicative of one or more measurements gathered by a mobile device 102 while located within a specific environment 108. Here, in certain example implementations one or more messages indicative of a measurement report may be received from an apparatus 104 of mobile device 102 by an apparatus 112 in electronic device 110 and provided for use by an anomaly detector 114, e.g., as identified below in example block 210. In certain other example implementations, at example block 202, a measurement report may be generated by apparatus 104 of mobile device 102 and provided for use by an anomaly detector 106 of mobile device 102, e.g., as identified below an example block 210.

At example block 204, one or more of the measurements may be determined (e.g., by apparatus 104) based, at least in part, on one or more measurements obtained using one or more sensors of mobile device 102. In certain instances, at example block 206, one or more of the measurements may be determined (e.g. by apparatus 104) based, at least in part, on one or more wireless signals acquired by mobile device 102. In certain instances, at example block 208, at least a portion of a determined track may be specified in a measurement report. Here, for example, a determined track may be indicative of a likely path followed by the mobile device within the specified environment over a period of time. While a determined track may be indicative, at least in part, of a most likely path believed to have been taken by the mobile device within the specified environment, it should be kept in mind that such a determined track may, at times, deviate from the actual movement of mobile device. For example, a determined track may deviate from the actual movement of the mobile device as a result of a positioning capability relying on an electronic file having one or more anomalies.

At example block 210, a plurality of positioning tracks for a mobile device relative to the specific environment may be generated. For example, the plurality of positioning tracks may comprise at least a first positioning track and a second positioning track. Here, the first positioning track may be determined based, at least in part, on the measurement report and at least one constraint as indicated in at least one electronic file. As previously mentioned, such a feature may have been previously identified (correctly or incorrectly) as being present within the specific environment. The second positioning track may be determined based, at least in part, on the measurement report but not the same constraint.

Hence, in certain instances, a second positioning track may be determined based, at least in part, on the measurement report without necessarily considering any constraints from such an electronic file. In certain other instances, second positioning track may be determined based, at least in part, on the measurement report and possibly a constraint which is different from the constraint applied in determining the first positioning track.

In certain example implementations, at example block 212, positioning tracks for one or more other mobile devices relative to the specific environment may be generated. Here, for example, an anomaly detector 114 in an electronic device 110 may generate positioning tracks based on measurement reports obtained from other mobile devices. In still other example implementations, an anomaly detector 106 in a mobile device 102 may be capable of generating additional or alternative positioning tracks for one or more other mobile devices, e.g., upon obtaining applicable measurement reports (e.g., directly and/or indirectly from the other mobile devices).

By way of example, in certain implementations positioning tracks may represent paths, trajectories, etc., corresponding to projected movements of the mobile device as may be determined, at least in part, using a motion model (e.g., implementing a particle filter, Kalman filter, etc.) to track a motion state of the mobile device. In certain instances, input(s) to such a motion model may be based, at least in part, on a measurement report and/or a constraint indicated in one or more electronic files. Such techniques are well known and beyond the scope of the present description.

At example block 214, a potential anomaly in the electronic file may be identified based, at least in part, on at least the first positioning track and the second positioning track. By way of example, in certain instances, at example block 216, at least two positioning tracks may be considered or otherwise compared in some manner to one another, e.g. to identify whether one of the positioning tracks may be more relatively more accurate, etc. By way of example, in certain instances if the first positioning track (which was generated based, at least in part, on a particular constraint as indicated in electronic file) is determined to be more accurate and/or likely correct than the second positioning track (which was generated without considering such particular constraint), then no anomaly may be identified in the electronic file, e.g., at least with respect to the particular constraint. Conversely, in certain instances if the second positioning track is determined to be more accurate and/or likely correct than the first positioning track, then an anomaly may be identified in the electronic file with respect to at least the particular constraint.

In certain example implementations, at example block 218, at least one positioning track may be considered or otherwise compared in some manner with a determined track of the mobile device. Here, for example, a determined track of mobile device may represent a positioning track determined possibly using a different technique. By way of example, a determined track of the mobile device may be determined using measurements obtained from signals transmitted by the mobile device as acquired by other devices (e.g., AP 142, etc.), user inputs, subsequent dead reckoning, previous and/or subsequent SPS position fixes and/or the like, etc. In certain instances, all or part of a determined track of the mobile device may be obtained from the mobile device, or from one or more other electronic devices. Accordingly, in certain instances a determined track may be of sufficient accuracy and/or likely correct to be compared to one or more generated positioning tracks, e.g. to possibly identify whether a particular constraint considered in generating a particular positioning track may or may not represent an anomaly with regard to electronic file specifying the particular constraint. Thus, for example, in certain instances an anomaly may be identified by comparing the first positioning track to the determined track.

In certain example implementations, at example block 220, a potential anomaly in an electronic file may be further identified based, at least in part, on one or more positioning tracks for one or more other mobile devices. Thus, for example, in certain instances a potential anomaly may be identified in an electronic file if the first positioning track (which was generated based, at least in part, on a particular constraint as indicated in electronic file) is determined to be sufficiently inaccurate and/or likely incorrect based on a comparison to one or more other positioning tracks corresponding to one or more other mobile devices within the specific environment.

By way of a particular example, let us assume that a first positioning track has been generated based, at least in part, on a constraint in an electronic map and/or routability graph indicating the presence an obstacle (e.g. a large bookshelf) which (if present within the specific environment) would under certain circumstances need to be navigated around by a user and/or machine carrying the mobile device.

First, let us assume that the large bookshelf is present within a specific environment. As such, the first positioning track may be generated based, at least in part, on an applicable constraint to correctly indicate that the mobile device moved around the large bookshelf rather than passing through it. The second positioning track may be generated based, at least in part, without applying such a constraint, and as such incorrectly indicates that the mobile device moved through the large bookshelf rather than navigate around it. Let us further assume that, if available, a determined track appears to indicate that the mobile device followed a path around the large bookshelf. Also let us assume that, if available, one or more positioning tracks for one or more other mobile devices appear to indicate that the other mobile devices followed paths which go around the large bookshelf. It appears likely that an anomaly would not be identified at block 214 (which is the correct verdict in this assumption) as a result of a comparison of the first positioning track and the second positioning track at example block 216, and/or a comparison of the first positioning track to a determined track at example block 218, and/or by considering one or more positioning tracks for one or more other mobile devices at example block 220.

Next, let us assume that the large bookshelf is no longer present (or possibly was never present) within a specific environment. Here, a first positioning track may be generated based, at least in part, on an applicable constraint to incorrectly indicate that the mobile device moved around the large bookshelf. The second positioning track may be generated based, at least in part, without applying such a constraint, and as such may more correctly indicate that the mobile device followed a path through the (nonexistent) large bookshelf rather than navigate around it. Here we may assume that, if available, a determined track also appears to indicate that the mobile device followed some path through the (nonexistent) large bookshelf. Still further, let us assume that, if available, one or more positioning tracks for one or more other mobile devices appear to indicate that the other mobile devices followed paths which also pass through the (nonexistent) large bookshelf. Since in this example the large bookshelf is not present, a potential anomaly may be identified at block 214, which may be supported by a comparison of the first positioning track and the second positioning track at example block 216, and/or a comparison of the first positioning track to a determined track at example block 218, and/or by considering one or more positioning tracks for one or more other mobile devices at example block 220.

Those skilled in the art should recognize that, in certain instances to identify a potential anomaly in an electronic file at block 214, a comparison of positioning tracks and/or a comparison of a positioning track to determined track may comprise application various mathematical and/or statistical techniques which may be indicative of certain differences and/or variances between certain tracks, and/or which may indicate a presence or absence of a potential anomaly. As mentioned, in certain instances a potential anomaly may correspond to one or more constraints and one or more electronic files. In certain instances, an indication of a presence or absence of a potential anomaly may be based, at least in part, on one or more threshold values which may relate to certain differences and/or variances between compared positioning tracks. In certain instances, an indication of a presence or absence of a potential anomaly may be based, at least in part, on one or more metrics representative of a perceived accuracy and/or reliability attributable to a particular positioning track, a particular determined track, a particular measurement report, a particular motion model, a particular electronic file, and/or the like or some combination thereof.

In certain example implementations, at example block 222, at least a portion of an electronic file may be changed in some manner, e.g., in response to identifying a potential anomaly therein, or possibly in response to not identifying a potential anomaly therein. By way of example, considering the large bookshelf example as previously mentioned, a constraint associated with the large bookshelf example may be changed in some manner as a result of determining that the large bookshelf appears to be present or absent in the specific environment. Thus, for example, in certain instances a constraint identified as having a potential anomaly may be changed, deleted, skipped in the future, flagged for subsequent consideration, marked as possibly unreliable, etc., within an electronic file. Conversely, for example, in certain instances a constraint that does not appear to present a potential anomaly may be marked as being reliable, possibly refined, etc., within an electronic file.

In certain example implementations, at example block 224, an anomaly alert may be initiated in some manner in response to identifying a potential anomaly. Here, for example, an anomaly alert may take on various forms which may involve one or more other electronic devices, various processes, and/or possibly include interaction with a user of one or more electronic devices.

With this in mind, one example of an anomaly alert may comprise indicating to a user of the mobile device that there may be an anomaly within one of the electronic files being used for positioning. In certain instances, an anomaly alert to a user may provide a warning or some other indication of a potential anomaly or possibly a related concern, prompt the user for instructions, prompt the user for additional information (e.g., possible observations that a user may provide with regard to the specific environment). Here, for example, user of a mobile device may be alerted to an anomaly by one or more visual and/or audio cues, e.g., via one or more input and/or output devices.

In yet another example, an anomaly alert may comprise indicating such to a user of a positioning system and/or one or more electronic devices. Thus for example, an anomaly alert may inform a content provider that there may be a potential anomaly in one or more electronic files that the content provider generates and/or otherwise maintains. In still other examples, an anomaly alert may initiate the sharing of information to one or more other mobile devices that may be within a specific environment or expected to be within a specific environment at some point in the future. Thus for example, an anomaly alert may be broadcast to a plurality of mobile devices by a terrestrial-based transmitting device, etc. hence, a mobile device receiving such an anomaly alert may take such action as desired to account for the potential anomaly.

Attention is drawn next to FIGS. 3(A)-(D), which are schematic diagrams illustrating how a presence, an absence, or possibly certain other changes of a feature within and/or with respect to a specific environment may result in certain potential anomalies in one or more electronic files that may be used to support mobile device positioning within such a specific environment, in accordance with an example implementation.

Figure 3:
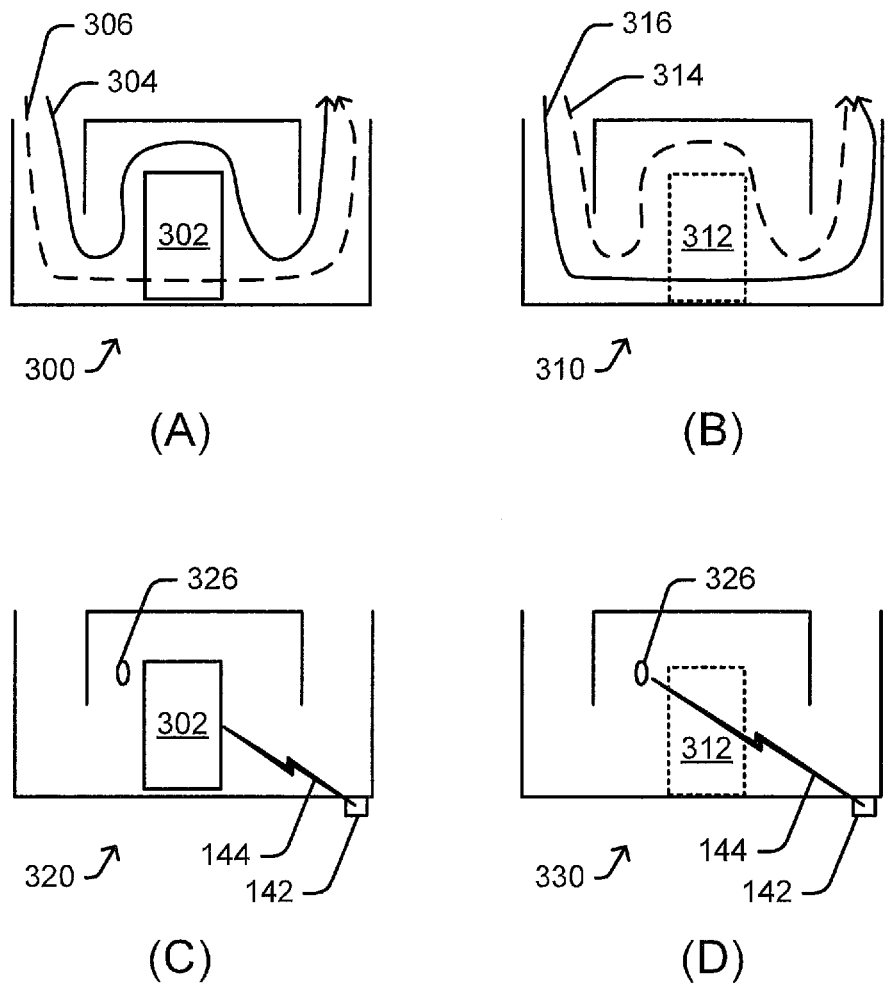
FIG. 3(A)-(D) are schematic diagrams illustrating how a presence, an absence, or possibly certain other changes of a feature within and/or with respect to a specific environment may result in certain potential anomalies in one or more electronic files that may be used to support mobile device positioning within such a specific environment, in accordance with an example implementation.

FIG. 3(A) is a floor plan corresponding to a portion 300 of a specific environment represented by walls forming a room with an entryway and exit way, and wherein an obstacle 302 is present within the room. Here, for example, a first path 304 illustrates a potential route that may be followed leading into the room, correctly navigating around obstacle 302, and out of the room. A second path 306 illustrates a potential path that may be followed leading into the room, incorrectly passing through obstacle 302, and out of the room.

If first path 304 were considered to represent a first positioning track and second path 306 were considered to represent a second positioning track, e.g., as generated at block 210 in example process 200, then a potential anomaly may not be identified as the constraint corresponding to obstacle 302 appears to properly represent the presence of such an obstacle within the specific environment.

FIG. 3(B) is a floor plan corresponding to a portion 310, which may represent portion 300 at a subsequent time, e.g., following removal of obstacle 302 (represented by a dashed-line area 312). Here, for example, a first path 314 illustrates a potential route that may be followed leading into the room, incorrectly navigating around (absent) obstacle 302, and out of the room. A second path 316 illustrates a potential path that may be followed leading into the room, correctly passing through the now unobstructed dashed-line area 312, and out of the room.

If first path 314 were considered to represent a first positioning track and second path 316 were considered to represent a second positioning track, e.g., as generated at block 210 in example process 200, then a potential anomaly may be identified as the constraint corresponding to (absent) obstacle 302 appears to improperly represent the presence of such an obstacle within the specific environment.

FIG. 3(C) is a floor plan corresponding to a portion 320, which may represent portion 300 and which further illustrates an AP 142 provisioned to transmit a wireless signal over a communication link 144. As illustrated in this example, at certain positions such as potential position 326 obstacle 302 may interfere with or otherwise affect wireless communication link 144.

FIG. 3(D) is a floor plan corresponding to a portion 330, which may represent portion 320 at a subsequent time following removal of obstacle 302. Obstacle 302 previously occupied an area now represented by dashed-lined box 312. As illustrated in this example, the removal of obstacle 302 may affect the signaling environment within the room, and particularly with regard to acquiring wireless signals from AP 142 at position 326.

Accordingly, it may be beneficial for a radio heatmap and/or other like electronic file corresponding to the use of wireless signals from AP 142 for positioning of a mobile device to relate to the signaling environment within the room, which may be affected by the presence and/or absence of obstacle 302. By way of example, as illustrated in this example obstacle 302 may affect an expected RSSI, RTT, etc., for a mobile device located at position 326. Accordingly, in certain instances a constraint corresponding to presence or absence of obstacle 302 within certain electronic files may or may not represent a potential anomaly, e.g., depending on whether or not the obstacle is present or absent. Consequently, the techniques provided herein may identify when a potential anomaly does exist within an electronic file such as a radio heatmap and/or the like, e.g., as result of comparing positioning tracks, etc.

Figure 4:
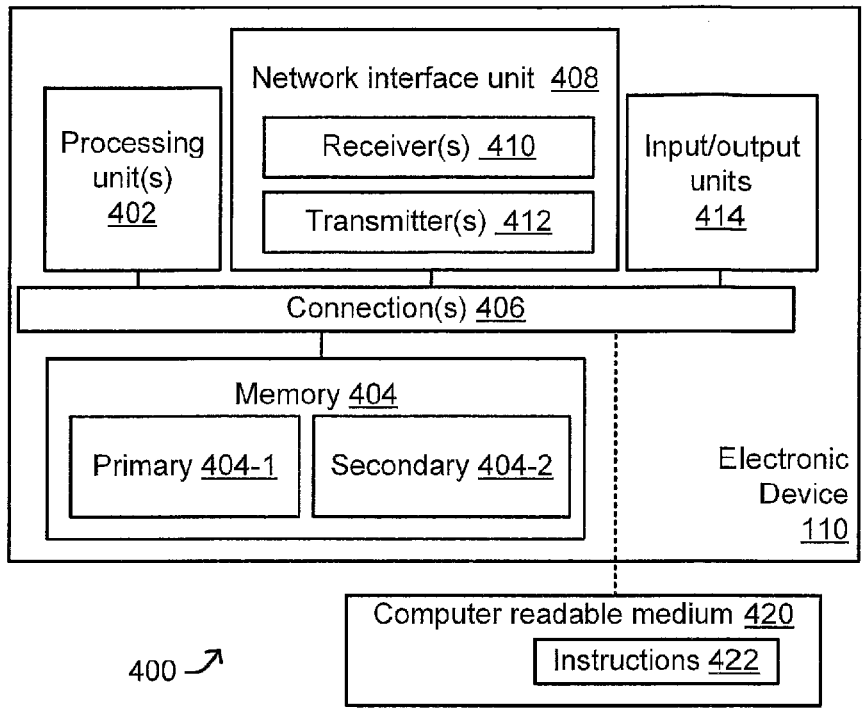
FIG. 4 is a schematic diagram illustrating certain features of an example electronic device to identify or otherwise support identification of one or more potential anomalies in one or more electronic files that may be used to support mobile device positioning within a specific environment, in accordance with an example implementation.

Reference is made next to FIG. 4, which is a schematic block diagram illustrating certain features of an example special computing platform 400 which may be provided as part of electronic device 110, and/or apparatus 112 provisioned therein.

As illustrated special computing platform 400 may comprise one or more processing units 402 (e.g., to perform data processing in accordance with the techniques provided herein, apparatus 112, anomaly detector 114) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit(s) 402, or other like circuitry within electronic device 110. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 420. Memory 404 and/or non-blended computer readable medium 420 may comprise instructions 422 for use in performing data processing, e.g., in accordance with the applicable techniques as provided herein.

Special computing platform 400 may, for example, further comprise one or more network interface unit(s) 408. Network interface unit(s) 408 may, for example, comprise one or more wired and/or wireless communication interfaces, represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, network interface unit(s) 408 may, for example, be enabled for use with various wired communication networks, e.g., such as telephone system, a local area network, a wide area network, a personal area network, an intranet, the Internet, etc.

Accordance with certain example implementations network interface unit(s) 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Electronic device 110 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

Figure 5:
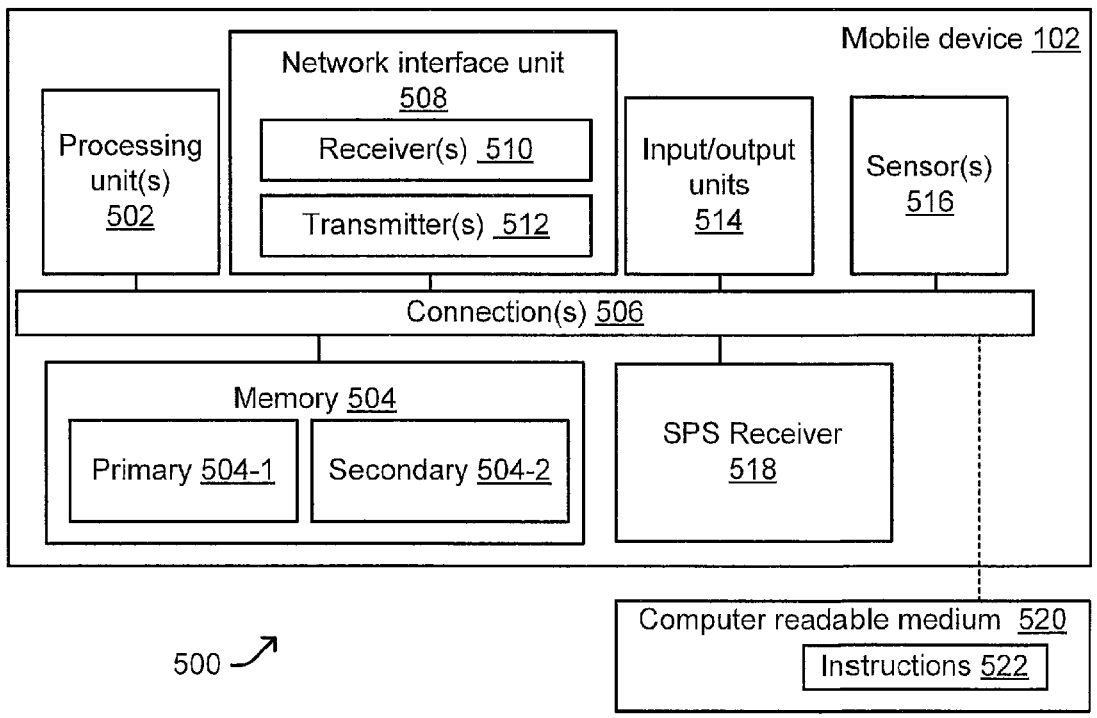
FIG. 5 is a schematic diagram illustrating certain features of an example mobile device to identify or otherwise support identification of one or more potential anomalies in one or more electronic files that may be used to support mobile device positioning within a specific environment, in accordance with an example implementation.

Attention is now drawn to FIG. 5, which is a schematic block diagram illustrating certain features of an example special computing platform 500 which may be provided as part of mobile device 102, and/or apparatus 104 provisioned therein.

As illustrated special computing platform 500 may comprise one or more processing units 502 (e.g., to perform data processing in accordance with the techniques provided herein, apparatus 104, anomaly detector 106) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located and coupled with processing unit(s) 502, or other like circuitry within mobile device 102. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 520. Memory 504 and/or non-blended computer readable medium 520 may comprise instructions 522 for use in performing data processing, e.g., in accordance with the applicable techniques as provided herein.

Special computing platform 500 may, for example, further comprise one or more network interface units 508. Network interface unit 508 may, for example, comprise one or more wired and/or wireless communication interfaces, represented here by one or more receivers 510 and one or more transmitters 512. It should be understood that in certain implementations, network interface unit 508 may comprise one or more transceivers, and/or the like. Further, it should be understood that although not shown, network interface unit 508 may comprise one or more antennas and/or other circuitry as may be applicable given the communication interface capability.

In accordance with certain example implementations, network interface unit 508 may, for example, be enabled for use with various wired communication networks, e.g., such as a telephone system, a local area network, a wide area network, a personal area network, an intranet, the Internet, etc.

Mobile device 102 may, for example, further comprise one or more input and/or output units 514. Input and/or output units 514 may represent one or more devices or other like mechanisms that may be used to obtain inputs from and/or provide outputs to one or more other devices and/or a user. Thus, for example, input and/or output units 514 may comprise various buttons, switches, a touch pad, a trackball, a joystick, a touch screen, a keyboard, a microphone, a camera, and/or the like, which may be used to receive one or more user inputs. In certain instances, input and/or output units 514 may comprise various devices that may be used in producing a visual output, an audible output, and/or a tactile output for a user. For example, input and/or output units 514 may be used to present a video display, graphical user interface, positioning and/or navigation related information, visual representations of electronic map, routing directions, etc., via a display mechanism and/or audio mechanism.

Mobile device 102 may, for example, comprise one or more sensors 516. For example, sensor(s) 516 may represent one or more environmental sensors, such as, e.g., a magnetometer or compass, a barometer or altimeter, etc., and which may be useful for positioning. For example, sensor(s) 516 may represent one or more inertial sensors, which may be useful in detecting certain movements of mobile device 102. Thus for example, sensor(s) 516 may comprise one or more accelerometers, one or one or more gyroscopes or gyrometers, Further, in certain instances sensor(s) 516 may comprise and/or take the form of one or more input devices such as a microphone, a camera, a light sensor, etc.

SPS receiver 518 may be capable of acquiring and acquiring wireless signals 134 via one or more antennas (not shown). SPS receiver 518 may also process, in whole or in part, acquired wireless signals 134 for estimating a position and/or a motion of mobile device 102. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of network interface unit 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a computing platform:
   obtaining a measurement report indicative of measurements gathered by a mobile device while located within a specific environment;
   generating a plurality of positioning tracks for said mobile device relative to said specific environment, said plurality of positioning tracks comprising at least:
   a first positioning track that is determined based, at least in part, on said measurement report and a constraint, said constraint being indicated in an electronic file and corresponding to a feature previously identified as being present within said specific environment; and
   a second positioning track that is determined based, at least in part, on said measurement report but not said constraint; and
   identifying a potential anomaly in said electronic file based, at east in part, on at least said first positioning track and said second positioning track.

2. The method as recited in claim 1, wherein identifying said potential anomaly in said electronic file comprises comparing said first positioning track with at least said second positioning track.

3. The method as recited in claim 1, wherein identifying said potential anomaly in said electronic file comprises comparing at least one of said plurality of positioning tracks with a determined track of said mobile device.

4. The method as recited in claim 1, and further comprising with said computing platform:
   changing at least a portion of said electronic file, in response to identifying said potential anomaly in said electronic file.

5. The method as recited in claim 1, and further comprising with said computing platform:
   initiating an anomaly alert, in response to identifying said potential anomaly in said electronic file.

6. The method as recited in claim 1, wherein said electronic file comprises at least one of: an electronic map, a routability graph, and/or a radio heatmap.

7. The method as recited in claim 1, wherein, if present within said specific environment, said feature is capable of affecting a movement of said mobile device within said specific environment.

8. The method as recited in claim 1, wherein:
   said measurement report is based, at least in part, on a wireless signal acquired by said mobile device; and
   said wireless signal is affected, at least in part, due to a presence or an absence of said feature within said specific environment.

9. The method as recited in claim 1, wherein said computing platform is provisioned within an electronic device that is located remote to said mobile device, and further comprising, with said computing platform:
   generating a plurality of positioning tracks for at least one other mobile device relative to said specific environment; and
   identifying said potential anomaly in said electronic file based further, at least in part, on at least one of said plurality of positioning tracks for said at least one other mobile device.

10. The method as recited in claim 1, wherein said computing platform is provisioned within said mobile device.

11. An apparatus for use in an electronic device, the apparatus comprising:
    means for obtaining a measurement report indicative of measurements gathered by a mobile device while located within a specific environment;
    means for generating a plurality of positioning tracks for said mobile device relative to said specific environment, said plurality of positioning tracks comprising at least:
    a first positioning track that is determined based, at least in part, on said measurement report and a constraint, said constraint being indicated in an electronic file and corresponding to a feature previously identified as being present within said specific environment; and
    a second positioning track that is determined based, at least in part, on said measurement report but not said constraint; and means for identifying a potential anomaly in said electronic file based, at least in part, on at least said first positioning track and said second positioning track.

12. The apparatus as recited in claim 11, and further comprising:
means for comparing at least said first positioning track with said second (positioning track.

13. The apparatus as recited in claim 11, and further comprising:
means for comparing at least one of said plurality of positioning tracks with a determined track of said mobile device.

14. The apparatus as recited in claim 11, and further comprising:
means for changing at least a portion of said electronic file, in response to identifying said potential anomaly in said electronic file.

15. The apparatus as recited in claim 11, and further comprising:
means for initiating an anomaly alert, in response to identifying said potential anomaly in said electronic file.

16. The apparatus as recited in claim 11, wherein said electronic file comprises at least one of: an electronic map, a routability graph, and/or a radio heatmap.

17. The apparatus as recited in claim 11, wherein, if present within said specific environment, said feature is capable of affecting a movement of said mobile device within said specific environment.

18. The apparatus as recited in claim 11, wherein:
said measurement report is based, at least in part, on a wireless signal acquired by said mobile device; and
said wireless signal is affected, at least in part, due to a presence or an absence of said feature within said specific environment.

19. The apparatus as recited in claim 11, wherein said electronic device is located remote to said mobile device, and further comprising:
means for generating a plurality of positioning tracks for at least one other mobile device relative to said specific environment; and
means for identifying said potential anomaly in said electronic file based further, at least in part, on at least one of said plurality of positioning tracks for said at least one other mobile device.

20. The apparatus as recited in claim 11, wherein said electronic device is implemented in said mobile device.

21. An electronic device comprising:
memory; and
a processing unit configured to:
obtain a measurement report from said memory, said measurement report being indicative of measurements gathered by a mobile device while located within a specific environment;
generate a plurality of positioning tracks for said mobile device relative to said specific environment, said plurality of positioning tracks comprising at least:
a first positioning track that is determined based, at least in part, on said measurement report and a constraint, said constraint being indicated in an electronic file and corresponding to a feature previously identified as being present within said specific environment; and
a second positioning track that is determined based, at least in part, on said measurement report but not said constraint; and
identify a potential anomaly in said electronic file based, at least in part, on at least said first positioning track and said second positioning track.

22. The electronic device as recited in claim 21, wherein said processing unit is further configured to:
compare at least said first positioning track with said second positioning track.

23. The electronic device as recited in claim 21, wherein said processing unit is further configured to:
compare at least one of said plurality of positioning tracks with a determined track of said mobile device.

24. The electronic device as recited in claim 21, wherein said processing unit is further configured to:
change at least a portion of said electronic file, in response to identifying said potential anomaly in said electronic file.

25. The electronic device as recited in claim 21, wherein said processing unit is further configured to:
initiate an anomaly alert, in response to identifying said potential anomaly in said electronic file.

26. The electronic device as recited in claim 21, wherein said electronic file comprises at least one of: an electronic map, a routability graph, and/or a radio heatmap.

27. The electronic device as recited in claim 21, wherein, if present within said specific environment, said feature is capable of affecting a movement of said mobile device within said specific environment.

28. The electronic device as recited in claim 21, wherein:
said measurement report is based, at least in part, on a wireless signal acquired by said mobile device; and
said wireless signal is affected, at least in part, due to a presence or an absence of said feature within said specific environment.

29. The electronic device as recited in claim 21, wherein said electronic device is located remote to said mobile device, and said processing unit to further:
generate a plurality of positioning tracks for at least one other mobile device relative to said specific environment; and
identify said potential anomaly in said electronic file based further, at least in part, on at least one of said plurality of positioning tracks for said at least one other mobile device.

30. The electronic device as recited in claim 21, wherein said electronic device is provisioned within said mobile device.

31. An article comprising:
a non-transitory computer readable medium having stored therein computer implementable instructions executable by a processing unit of a computing platform to:
obtain a measurement report indicative of measurements gathered by a mobile device while located within a specific environment;
generate a plurality of positioning tracks for said mobile device relative to said specific environment, said plurality of positioning tracks comprising at least:
a first positioning track that is determined based, at least in part, on said measurement report and a constraint, said constraint being indicated in an electronic file and corresponding to a feature previously identified as being present within said specific environment; and
a second positioning track that is determined based, at least in part, on said measurement report but not said constraint; and identify a potential anomaly in said electronic file based, at least in part, on at least said first positioning track and said second positioning track.

32. The article as recited in claim 31, said computer implementable instructions being further executable by said processing unit to:
compare at least said first positioning track with said second positioning track.

33. The article as recited in claim 31, said computer implementable instructions being further executable by said processing unit to:
compare at least one of said plurality of positioning tracks with a determined track of said mobile device.

34. The article as recited in claim 31, said computer implementable instructions being further executable by said processing unit to:
change at least a portion of said electronic file, in response to identifying said potential anomaly in said electronic file.

35. The article as recited in claim 31, said computer implementable instructions being further executable by said processing unit to:
initiate an anomaly alert, in response to identifying said potential anomaly in said electronic file.

36. The article as recited in claim 31, wherein said electronic file comprises at least one of: an electronic map, a routability graph, and/or a radio heatmap.

37. The article as recited in claim 31, wherein, if present within said specific environment, said feature is capable of affecting a movement of said mobile device within said specific environment.

38. The article as recited in claim 31, wherein:
said measurement report is based, at least in part, on a wireless signal acquired by said mobile device; and
said wireless signal is affected, at least in part, due to a presence or an absence of said feature within said specific environment.

39. The article as recited in claim 31, wherein said computing platform is provisioned within an electronic device that is located remote to said mobile device, and said computer implementable instructions being further executable by said processing unit to:
generate a plurality of positioning tracks for at least one other mobile device relative to said specific environment; and
identify said potential anomaly in said electronic file based further, at least in part, on at least one of said plurality of positioning tracks for said at least one other mobile device.

40. The article as recited in claim 31, wherein said computing platform is provisioned within said mobile device.

* * * * *